United States Patent [19]

Iskiyan et al.

[11] Patent Number: 5,692,155

[45] Date of Patent: Nov. 25, 1997

[54] METHOD AND APPARATUS FOR SUSPENDING MULTIPLE DUPLEX PAIRS DURING BACK UP PROCESSING TO INSURE STORAGE DEVICES REMAIN SYNCHRONIZED IN A SEQUENCE CONSISTENT ORDER

[75] Inventors: James Lincoln Iskiyan; Robert Frederic Kern; William Frank Micka, all of Tucson, Ariz.; Robert Wesley Shomler, Morgan Hill, Calif.

[73] Assignee: International Business Machines Corporation, Armonk, N.Y.

[21] Appl. No.: 424,930

[22] Filed: Apr. 19, 1995

[51] Int. Cl.$^6$ ............................................. G06F 13/00
[52] U.S. Cl. ........................................ 395/489; 395/182.04
[58] Field of Search ...................................... 395/489, 488, 395/182.04, 182.1, 182.11

[56] References Cited

U.S. PATENT DOCUMENTS

| | | | |
|---|---|---|---|
| 4,862,411 | 8/1989 | Dishon et al. | 395/494 |
| 5,051,887 | 9/1991 | Berger et al. | 395/489 |
| 5,155,845 | 10/1992 | Beal et al. | 395/182.04 |
| 5,239,659 | 8/1993 | Rudeseal et al. | 395/800 |
| 5,398,331 | 3/1995 | Huang et al. | 395/182.1 |
| 5,404,508 | 4/1995 | Konrad et al. | 395/600 |
| 5,412,801 | 5/1995 | de Remer et al. | 395/182.18 |
| 5,446,871 | 8/1995 | Shomler et al. | 395/180 |
| 5,459,857 | 10/1995 | Ludlam et al. | 395/182.04 |
| 5,493,724 | 2/1996 | Cohn et al. | 395/858 |
| 5,504,861 | 4/1996 | Crockett et al. | 395/182.11 |
| 5,513,314 | 4/1996 | Kandasamy et al. | 395/182.04 |
| 5,528,755 | 6/1996 | Beardsley et al. | 395/185.01 |

*Primary Examiner*—Eddie P. Chan
*Assistant Examiner*—Hong C. Kim
*Attorney, Agent, or Firm*—R. M. Sullivan

[57] ABSTRACT

A data storage system atomically suspends multiple duplex pairs across either a single storage subsystem or multiple storage subsystems. The duplex pairs are suspended such that the data on the secondary DASDs of the duplex pairs is maintained in a sequence consistent order. A host processor in the data storage system running an application generates records and record updates to be written to the primary DASDs of the duplex pairs. The storage controller directs copies of the records and record updates to the secondary DASDs of the duplex pairs. Sequence consistency is maintained on the secondary DASDs by quiescing the duplex pairs and then suspending the duplex pairs with change recording. Quiescing the duplex pairs allows any current write I/O in progress to complete to the primary DASD. The storage controller then locks out any subsequent write I/O from the host processor by raising a long busy signal to such subsequent write requests. Suspending the duplex pairs with change recording directs the storage controller to mark the physical address of the primary DASD which the application in the host processor updates between the time the duplex pair is suspended and then is reestablished.

17 Claims, 7 Drawing Sheets

METHOD AND APPARATUS FOR SUSPENDING MULTIPLE DUPLEX PAIRS DURING BACK UP PROCESSING TO INSURE STORAGE DEVICES REMAIN SYNCHRONIZED IN A SEQUENCE CONSISTENT ORDER

FIELD OF THE INVENTION

The present invention relates generally to data storage techniques, and more particularly, to a system for atomically suspending dual copy or remote dual copy operations across multiple devices or device subsystems.

BACKGROUND OF THE INVENTION

Data processing systems, in conjunction with processing data, typically are required to store large amounts of data (or records), which data can be efficiently accessed, modified, and re-stored. Data storage is typically separated into several different levels, or hierarchically, in order to provide efficient and cost effective data storage. A first, or highest level of data storage involves electronic memory, usually dynamic or static random access memory (DRAM or SRAM). Electronic memories take the form of semiconductor integrated circuits wherein millions of bytes of data can be stored on each circuit, with access to such bytes of data measured in nano-seconds. The electronic memory provides the fastest access to data since access is entirely electronic.

A second level of data storage usually involves direct access storage devices (DASD). DASD storage, for example, can comprise magnetic and/or optical disks, which store bits of data as micrometer sized magnetically or optically altered spots on a disk surface for representing the "ones" and "zeros" that make up those bits of the data. Magnetic DASD, includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA), typically includes one or more read/write heads, and is provided in each DASD for moving across the tracks to transfer the data to and from the surface of the disks as the disks are rotated past the read/write heads. DASDs can store giga-bytes of data with the access to such data typically measured in milli-seconds (orders of magnitudes slower than electronic memory). Access to data stored on DASD is slower due to the need to physically position the disk and HDA to the desired data storage location.

A third or lower level of data storage includes tape and/or tape and DASD libraries. Access to data is much slower in a library since a robot is necessary to select and load the needed data storage medium. The advantage is reduced cost for very large data storage capabilities, for example, tera-bytes of data storage. Tape storage is often used for back-up purposes, that is, data stored at the second level of the hierarchy is reproduced for safe keeping on magnetic tape. Access to data stored on tape and/or in a library is presently on the order seconds.

Having a back-up data copy is mandatory for many businesses as data loss could be catastrophic to the business. The time required to recover data lost at the primary storage level is also an important recovery consideration. An improvement in speed over tape or library back-up, includes dual copy. An example of dual copy involves providing additional DASD's so that data is written to the additional DASDs (sometimes referred to as mirroring). Then if the primary DASDs fail, the secondary DASDs can be depended upon for data. A drawback to this approach is that the number of required DASDs is doubled.

Another data back-up alternative that overcomes the need to provide double the storage devices involves writing data to a redundant array of inexpensive devices (RAID) configuration. In this instance, the data is written such that the data is apportioned amongst many DASDs. If a single DASD fails, then the lost data can be recovered by using the remaining data and error correction procedures. Currently there are several different RAID configurations available.

The aforementioned back-up solutions are generally sufficient to recover data in the event that a storage device or medium fails. These back-up methods are useful only for device failures since the secondary data is a mirror of the primary data, that is, the secondary data has the same volume serial numbers (VOLSERs) and DASD addresses as the primary data. System failure recovery, on the other hand, is not available using mirrored secondary data. Hence still further protection is required for recovering data if a disaster occurs destroying the entire system or even the site, for example, earthquakes, fires, explosions, hurricanes, etc. Disaster recovery requires that the secondary copy of data be stored at a location remote from the primary data. A known method of providing disaster protection is to back-up data to tape, on a daily or weekly basis, etc. The tape is then picked up by a vehicle and taken to a secure storage area usually some kilo-meters away from the primary data location. A problem is presented in this back-up plan in that it could take days to retrieve the back-up data, and meanwhile several hours or even days of data could be lost, or worse, the storage location could be destroyed by the same disaster. A somewhat improved back-up method would be to transmit data to a back-up location each night. This allows the data to be stored at a more remote location. Again, some data may be lost between back-ups since back-up does not occur continuously, as in the dual copy solution. Hence, a substantial data amount could be lost which may be unacceptable to some users.

More recently introduced data disaster recovery solutions include remote dual copy wherein data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Dual copy entails a primary volume and a secondary volume in the DASD subsystems forming a duplex pair. Copying in the DASD subsystems is controlled by I/O commands to the copied volumes. Such I/O commands provide a device-by-device control for establishing or suspending duplex pairs, or queuing the status of a duplex pair. Device-by-device control, however, is not adequate for all disaster recovery applications. The copied data at the secondary location is useable only so long as that copied data is time-consistent (sequential consistency) with the original data. Historically, the I/O commands assured such consistency by stopping the system while copying data, thus ensuring that further updates to data did not occur. An improvement to this method is known as T0 or concurrent copy, which reduced the time the system is halted, but suspensions were still required.

Real time dual copy, for example, Extended Remote Copy (XRC) or Peer to Peer Remote Copy (PPRC), ensures time consistency across the secondary volumes so that those copies are usable for disaster recovery. But, once again, primary system suspension is necessary for device-by-device control. These suspensions cause unacceptable disruptions in some systems. XRC systems provides a solution via a software controlled data mover wherein a single command stops a session such that secondary devices are time consistent due in part to the asynchronous nature of the copy operation. This data mover solution is not available in the dual copy or PPRC back-up environments, which copies data synchronously on a volume by volume basis. Each volume is copy independent from any other volume but the data on a set of volumes can be logically dependent.

Thus, what is needed is a disaster recovery system capable to cause a sequence consistent suspension of copying for a set of independent devices with minimal delay in the system operation without requiring system operation suspension.

SUMMARY OF THE INVENTION

An object of the present invention is to provide an improved design and method for atomically controlling multiple devices in a synchronous dual copy storage system.

Another object of the present invention is to provide an improved method and system for quiescing multiple synchronous duplex pairs without suspending system operation, yet maintaining the logical dependencies of the data on the secondary data storage devices.

According to a first embodiment of the present invention, a method is provided for suspending a first and second duplex pair while the copying of records and record updates is in progress. A data storage system for carrying out the method includes a host processor running an application generating records and record updates. A first duplex pair includes a primary data storage device and a secondary data storage device, while a second duplex pair also includes a primary data storage device and a secondary data storage device. A storage controller is coupled between the host processor and the primary data storage devices of the first and second duplex pairs. The method quiesces the first duplex pair by responding, in the storage controller, to an initial quiesce command from the host processor to inhibit writing future records and record updates from the application to the primary data storage device of the first duplex pair. The method also quiesces the second duplex pair by responding, in the storage controller, to a subsequent quiesce command from the host processor for inhibiting the writing of future records and record updates from the application to the primary data storage device of the second duplex pair. This coordinates records and record updates copied to the secondary data storage device of the first and second duplex pairs in a sequence consistent order. The first and second duplex pairs are then suspended by the storage controller after receiving a suspend command from the host processor and copying is inhibited. The storage controller then signals the application that the first and second duplex pairs are suspended and subsequent records and record updates can be written to the primary data storage devices without copying the record to the secondary data storage devices. But since the duplex pairs were first quiesced, all secondary data storage devices are sequence consistent in regards to the application at a specific point in time.

In another embodiment of the present invention, a storage controller is provided in a data storage system for copying records and record updates to first and second duplex pair, and for suspending each duplex pair while copying records and record updates is in progress. The data storage system includes a host processor running an application and each duplex pair further includes a primary data storage device and a secondary data storage device. The storage controller is coupled between the host processor and each primary data storage device. The application generates records and record updates and issues a quiesce duplex pair command and a suspend duplex pair command. Records and record updates are stored on the primary storage devices while respective copies thereof are stored on the secondary storage devices.

A storage path in the storage controller directs records and record updates between the host processor and the first and second duplex pairs. Additionally, the storage path quiesces the first and second duplex pairs in response to the quiesce duplex pair commands from the application. The first and second duplex pairs are suspended by the storage path in response to the suspend duplex pair commands from the application such that the records and record updates are copied to each secondary data storage device and synchronized in a sequence consistent order. A memory is provided for initially storing the records and record updates to be copied to said secondary data storage device of the duplex pairs.

The foregoing and other objects, features, and advantages of the invention will be apparent from the following more particular description of a preferred embodiment of the invention, as illustrated in the accompanying drawing.

DETAILED DESCRIPTION

A typical data processing system may take the form of a host processor, such as an IBM System/370 or IBM System/390 processor for computing and manipulating data, and running, for example, data facility storage management subsystem/multiple virtual systems (DFSMS/MVS) software, having at least one IBM 3990 storage controller attached thereto. Typically the storage controller includes a memory controller and one or more cache memory types incorporated therein. The storage controller is further connected to a group of direct access storage devices (DASDs) such as IBM 3380 or 3390 DASDs. While the host processor provides substantial computing power, the storage controller provides the necessary functions to efficiently transfer, stage/destage, convert and generally access large databases.

One form of protecting data in the data storage system is to back-up the data of one DASD on another DASD. This procedure for providing data back-up is commonly referred to as dual copy. The data is stored on a primary DASD and copied to a secondary DASD. The primary and secondary DASD form a duplex pair. The primary and secondary devices of a dual copy duplex pair can be grouped in separate device strings, but they must be connected to the same storage controller. Because of the requirement to be connected to the same controller, dual copy is an acceptable method for data back-up, but it is not feasible for a disaster recovery system.

Disaster recovery protection for the typical data processing system requires that primary data stored on primary DASDs be backed-up at a secondary or remote location. The distance separating the primary and secondary locations depends upon the level of risk acceptable to the user, and can vary from several kilo-meters to thousands of kilo-meters. The secondary or remote location, in addition to providing a back-up data copy, must also have enough system information to take over processing for the primary system should the primary system become disabled. This is due in part because a single storage controller does not write data to both primary and secondary DASD strings at the primary and secondary sites. Instead, the primary data is stored on a primary DASD string attached to a primary storage controller while the secondary data is stored on a secondary DASD string attached to a secondary storage controller.

The secondary site must not only be sufficiently remote from the primary site, but must also be able to back-up primary data in real time. The secondary site needs to back-up primary data as the primary data is updated with some minimal delay. Additionally, the secondary site has to back-up the primary data regardless of the application program (e.g., IMS, DB2) running at the primary site and generating the data and/or updates. A difficult task required of the secondary site is that the secondary data must be order consistent, that is, secondary data is copied in the same sequential order as the primary data (sequential consistency) which requires substantial system considerations. Sequential consistency is complicated by the existence of multiple storage controllers each controlling multiple DASDs in a data processing system. Without sequential consistency, secondary data inconsistent with primary data would result, thus corrupting disaster recovery.

Remote data duplexing falls into two general categories, synchronous and asynchronous. Synchronous remote copy involves sending primary data to the secondary location and confirming the reception of such data before ending a primary DASD input/output (I/O) operation (providing a channel end (CE) and device end (DE) to the primary host). Synchronous copy, therefore, slows the primary DASD I/O response time while waiting for secondary confirmation. Primary I/O response delay is increased proportionately with the distance between the primary and secondary systems—a factor that limits the remote distance to tens of kilo-meters. Synchronous copy, however, provides sequentially consistent data at the secondary site with relatively little system overhead.

Asynchronous remote copy provides better primary application system performance because the primary DASD I/O operation is completed (providing a channel end (CE) and device end (DE) to the primary host) before data is confirmed at the secondary site. Therefore, the primary DASD I/O response time is not dependent upon the distance to the secondary site and the secondary site could be thousands of kilo-meters remote from the primary site. A greater amount of system overhead is required, however, for ensuring data sequence consistency since data received at the secondary site will often not be in order of the primary updates. A failure at the primary site could result in some data being lost that was in transit between the primary and secondary locations.

Asynchronous Remote Copy

Asynchronous remote data shadowing is used when it is necessary to separate the primary and secondary sites by a great distance thereby reducing the probability that a single disaster will corrupt both primary and secondary sites, or when primary application performance impact needs to be minimized. While the distance between primary and secondary sites can now stretch across the earth or beyond, the synchronization of write updates across multiple DASD volumes behind multiple primary subsystems to multiple secondary subsystems is substantially more complicated. Record write updates can be shipped from a primary storage controller via a primary data mover to a secondary data mover for shadowing on a secondary storage subsystem, but the amount of control data passed therebetween must be minimized while still being able to re-construct an exact order of the record write updates on the secondary system across several storage controllers as occurred on the primary system across multiple DASD volumes behind several storage controllers.

Synchronous Remote Copy

Synchronous real time remote copy for disaster recovery requires that copied DASD volumes form a set. Forming such a set further requires that a sufficient amount of system information be provided to the secondary site for identifying those volumes (VOLSERs) comprising each set and the primary site equivalents. Importantly, the secondary site forms a "duplex pair" with the primary site and the secondary site must recognize when one or more volumes are out of sync with the set, that is, "failed duplex" has occurred. Connect failures are more visible in synchronous remote copy than in asynchronous remote copy because the primary DASD I/O is delayed while alternate paths are retried. The primary site can abort or suspend copy to allow the primary site to continue while updates for the secondary site are queued, the primary site marking such updates to show the secondary site is out of sync. Recognizing exception conditions that may cause the secondary site to fall out of sync with the primary site is needed in order that the secondary site be available at any time for disaster recovery. Error conditions and recovery actions must not make the secondary site inconsistent with the primary site.

Maintaining a connection between the secondary site and the primary site with secondary DASD present and accessible, however, does not ensure data content synchronism. The secondary site may lose synchronism with the primary site for a number of reasons. The secondary site is initially out of sync when the duplex pair is being formed and reaches sync when an initial data copy is completed. The primary site may break the duplex pair if the primary site is unable to write updated data to the secondary site in which case the primary site writes updates to the primary DASD under suspended duplex pair conditions so that the updating application can continue. The primary site is thus running exposed, that is, without current disaster protection copy until the duplex pair is restored. Upon restoring the duplex pair, the secondary site is not immediately in sync. After applying now pending updates, the secondary site returns to sync. The primary site can also cause the secondary site to lose sync by issuing a suspend command for that volume to the primary DASD. The secondary site resyncs with the primary site after the suspend command is ended, duplex pair is re-established, and pending updates are copied. On-line maintenance can also cause synchronization to be lost.

When a secondary volume is out of sync with a primary volume, the secondary volume is not useable for secondary system recovery and resumption of primary applications. An out-of-sync volume at the secondary site must be identified as such and secondary site recovery-takeover procedures need to identify the out-of-sync volumes for denying application access (forcing the volumes off-line or changing their VOLSERs). The secondary site may be called upon to recover the primary site at any instant wherein the primary site host is inaccessible—thus the secondary site requires all pertinent information about a sync state of all volumes. The secondary storage subsystem, that is the secondary storage controllers and DASD, is unable to determine all conditions causing the primary site to break synchronism due to primary site-encountered exceptions. For example, the primary site may break a duplex pair if the primary site is unable to access the secondary peer due to a primary I/O path or link failure that the secondary site is unaware of. In this case the secondary site shows in-sync state while the primary site indicates the duplex pair is broken.

External communication may notify the secondary site that an out-of-sync duplex pair volume exists. This is realizable by employing a user systems management function. Primary I/O operations end with channel end/device end/unit check (CE/DE/UC) status and sense data indicates the nature of the error. With this form of I/O configuration an error recovery program (ERP) processes the error and sends an appropriate message to the secondary processor before posting the primary application that I/O is complete. The user is then responsible to recognize the ERP suspend duplex pair message and secure that information at the secondary location. When the secondary site is depended upon to become operational in place of the primary site, a start-up procedure brings the secondary DASD on-line to the secondary host wherein sync status stored in the secondary DASD subsystem is retrieved for ensuring that out-of-sync volumes are not brought on-line for application allocation. This sync status merged with all ERP suspend duplex pair messages gives a complete picture of the secondary out-of-sync volumes.

Figure 1:
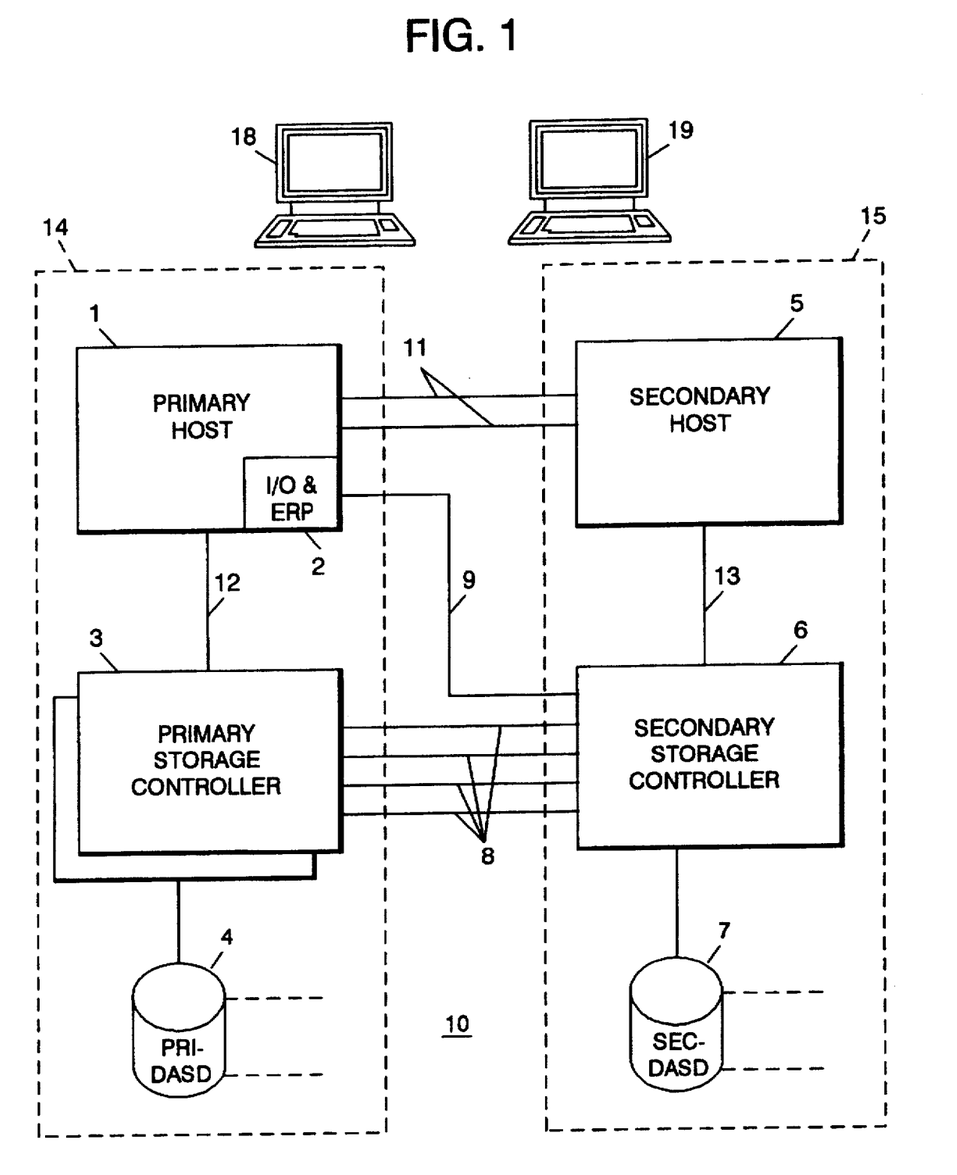
FIG. 1 is a block diagram of a disaster recovery system having synchronous remote data shadowing capabilities.

Referring now to FIG. 1, a disaster recovery system 10 is shown having a primary site 14 and a secondary site 15, wherein the secondary site 15 is located, for example, 20 kilometers remote from the primary site 14. The primary site 14 includes a host processor or primary processor 1 having an application and system I/O and Error Recovery Program 2 running therein (hereinafter referred to as I/O ERP 2). The primary processor 1 could be, for example, an IBM Enterprise Systems/9000 (ES/9000) processor running DFSMS/MVS operating software and further may have several application programs running thereon. A primary storage controller 3, for example, an IBM 3990 Model 6 storage controller, is connected to the primary processor 1 via a channel 12. As is known in the art, several such primary storage controllers 3 can be connected to the primary processor 1, or alternately, several primary processors 1 can be attached to the primary storage controllers 3. A primary DASD 4, for example, an IBM 3390 DASD, is connected to the primary storage controller 3. Several primary DASDs 4 can be connected to the primary storage controller 3. The primary storage controller 3 and attached primary DASD 4 form a primary substorage system. Further, the primary storage controller 3 and the primary DASD 4 could be single integral units.

The secondary site 15 includes a secondary processor 5, for example, an IBM ES/9000, connected to a secondary storage controller 6, for example an IBM 3990 Model 6, via a channel 13. A DASD 7 is further connected to the secondary storage controller 6. The primary processor 1 is connected to the secondary processor 5 by at least one host-to-host communication link 11, for example, channel links or telephone T1/T3 line links, etc. The primary processor 1 may also have direct connectivity with the secondary storage controller 6 by, for example, multiple Enterprise Systems Connection (ESCON) links 9. As a result, the I/O ERP 2 can communicate, if required, with the secondary storage controller 6. The primary storage controller 3 communicates with the secondary storage controller 6 via multiple peer-to-peer links 8, for example, multiple ESCON links.

When a write I/O operation is executed by an application program running in the primary processor 1, a hardware status channel end/device end (CE/DE) is provided indicating the I/O operation completed successfully. Primary processor 1 operating system software marks the application write I/O successful upon successful completion of the I/O operation, thus permitting the application program to continue to a next write I/O operation which may be dependent upon the first or previous write I/O operation having successfully completed. On the other hand, if the write I/O operation was unsuccessful, the I/O status of channel end/device end/unit check (hereinafter referred to as CE/DE/UC) is presented to the primary processor 1 operating system software. Having presented unit check, the I/O ERP 2 takes control obtaining specific sense information from the primary storage controller 3 regarding the nature of the failed write I/O operation. If a unique error to a volume occurs then a unique status related to that error is provided to the I/O ERP 2. The I/O ERP 2 can thereafter perform new peer-to-peer synchronization error recovery for maintaining data integrity between the primary storage controller 3 and the secondary storage controller 6, or in the worst case, between the primary processor 1 and the secondary processor 5.

Figure 2:
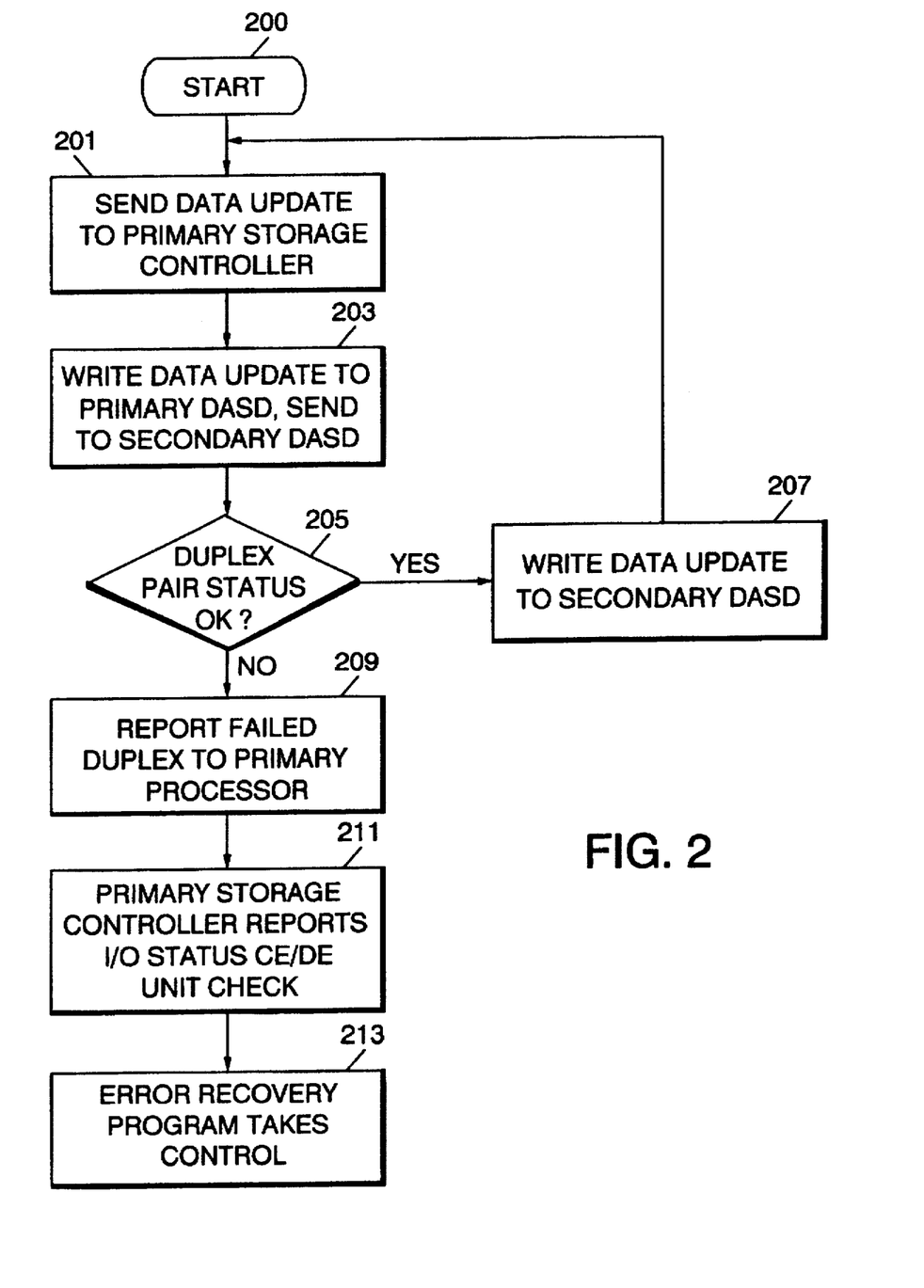
FIG. 2 is a flow diagram of a method for providing synchronous remote copy according to the disaster recovery system of FIG. 1.

Referring to FIG. 2 the error recovery procedure is set forth. In FIG. 2, a step 201 includes an application program running in the primary processor 1 sending a data update to the primary storage controller 3. At step 203 the data update is written to the primary DASD 4, and the data update is shadowed to the secondary storage controller 6. At step 205 the duplex pair status is checked to determine whether the primary and secondary sites are synchronized. If the duplex pair status is in a synchronized state, then the data update is written to the secondary DASD 7 at step 207 while processing continues at the primary processor 1 via application programs running thereat.

In the case that the duplex pair is in a "failed" state, then at step 209 the primary storage controller 3 notifies the primary processor 1 that duplex pair has suspended or failed. The duplex pair can become "failed" due to communication failure between the primary storage controller 3 and the secondary storage controller 6 via communication links 8. Alternatively, duplex pair can become "failed" due to errors in either the primary or secondary subsystem. If the failure is in the communication links 8, then the primary storage controller 3 is unable to communicate the failure directly to the secondary storage controller 6. At step 211 the primary storage controller 3 returns I/O status CE/DE/UC to the primary processor 1. The I/O ERP 2 quiesces the application programs hence taking control of the primary processor 1 at step 213 for error recovery and data integrity before returning control to the application requesting the write I/O operation.

Figure 3:
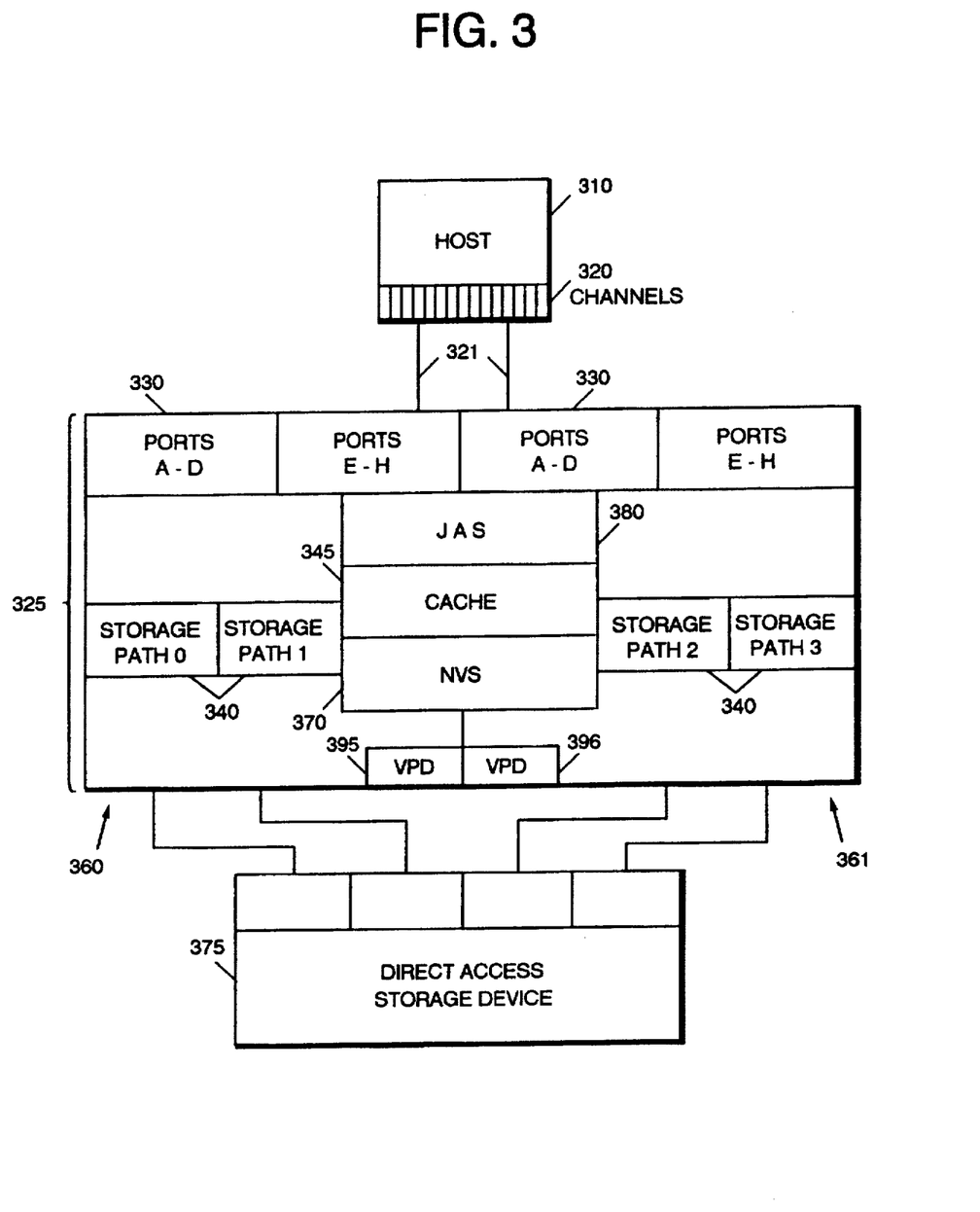
FIG. 3 is a block diagram showing a storage controller in greater detail as connected in data storage system.

Referring to FIG. 3, a storage controller 325, for example an IBM 3990 storage controller, is shown in greater detail as connected to a data processing system including a host processor 310, such as an IBM System/370 or IBM Enterprise Systems/9000 (ES/9000) processor running, for example, data facility storage management subsystem/ multiple virtual systems (DFSMS/MVS) software. The storage controller 325 is further connected to a direct access storage device (DASD) 375, such as an IBM 3380 or 3390 DASD. A storage subsystem is formed by the storage controller 325 and DASD 375. The storage subsystem is connected to the host processor 310 via communication links 321, wherein the communication links 321 connect to channels 320 of the host processor 310 and to ports A–D, E–H 330 of the storage controller 325. The communication links 321 can be either parallel or serial links, for example, enterprise system connections (ESCON) serial fiber optic links.

The storage controller 325 includes dual clusters 360 and 361, the dual clusters 360, 361 having separate power supplies (not shown) and further including ports A–D, E–H 330 for providing a communication interface thereto. Both non-volatile storage (NVS) 370 and cache 345 are provided for temporary data storage and are accessible to both clusters 360, 361. Storage paths 0–3 340 provide necessary paths to the DASD 375. Vital product data is maintained in VPDs 395 and 396. A storage controller, similar to the storage controller 325 is described in U.S. Pat. No. 5,051,887, assigned to the assignee of the present invention, and is hereby incorporated by reference.

Figure 4:
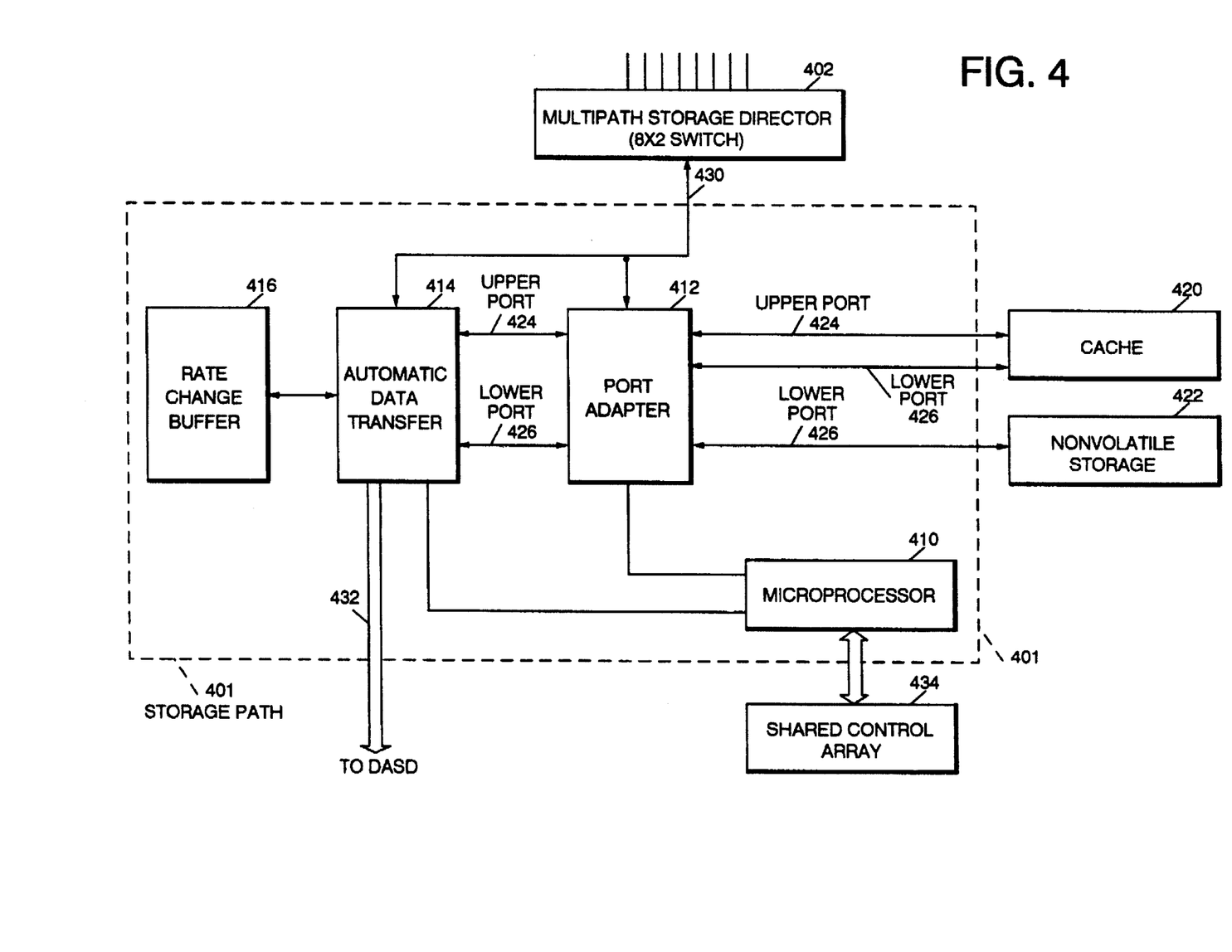
FIG. 4 is a block diagram showing a storage path in greater detail as connected in a storage controller in a data storage system.

FIG. 4 shows a storage path 401 of the storage controller in greater detail. As shown earlier in FIG. 3, the storage controller contains four storage paths, each storage path being identical to the other three. Thus, only one storage path will be described in detail. The storage path 401 is connected to an 8×2 switch 402 by an upper channel port 430 and to a plurality of DASDs by a lower device port 432. The storage path 401 contains a microprocessor 410 which controls all operations taking place within the storage path 401. The microprocessor 410 is capable of interpreting channel commands received from the host processor as well as controlling the attached DASDs. The microprocessor 410 executes microinstructions loaded into a control memory, or control store (not shown), through an external support facility.

A shared control array (SCA) 434 is also shown in FIG. 4. The SCA contains information shared by all four storage paths of the storage controller. Each microprocessor 410 in the storage path 401 accesses the SCA 434 to obtain shared information. Typical shared information includes certain external registers used by the microprocessors of all four storage paths, device status, and channel reconnection data.

The storage path 401 also contains a port adaptor (PA) 412 which provides data paths and control lines for the transfer of data between cache 420, non-volatile storage (NVS) 422, and an automatic data transfer (ADT) buffer 414, 416. The ADT buffer consists of an ADT circuit 414 and a rate change buffer 416. The rate change buffer 416 compensates for differences between the data transfer rate of the DASD and the host processor to channel connection. Typically in data processing systems, data transfer rates between a channel and a storage controller, or channel transfer rates, are much higher than data transfer rates between a DASD and a storage controller, or DASD transfer rates.

The port adaptor 412 uses an upper cache port 426 and a lower cache port 428 to provide the data paths between the cache 420, NVS 422, and ADT buffer 414, 416. These two ports allow for two simultaneous transfers involving the cache 420. For example, data can be transferred from the cache 420 to the channel using the upper cache port 424 at the same time data is transferred from the DASD to the cache 420 using the lower cache port 426. Data transfer is initialized by the microprocessor 410 and then once started is controlled by the ADT circuit 414 without microprocessor intervention until completion.

The storage path 401 directs the transfer of data records from the host processor to one of the plurality of DASDs during direct DASD operations, caching operations, or fast write operations. Direct DASD operations involve the transfer of data between the host processor and one of the plurality of DASDs without using cache or NVS for temporary storage of the data. In this case, the storage path 401 uses the ADT buffer 414, 416 to temporarily store the data for transfer to the DASD.

During caching operations, the storage path 401 stores the data in the cache memory 420 and branches the data to the DASD. In this case, the data is transferred into the ADT buffer 414, 416 using the upper channel port 430. The data is then transferred from the ADT buffer 414, 416 to the cache memory 420 using the upper cache port 424 and to the DASD using the lower device port 432. The data remains in the cache memory 420 for a time interval after it is branched to the DASD. If the host processor requests to read the data before it is updated, the storage path 401 can direct the data to be read from the cache 420 thereby increasing the performance of the data processing system.

During fast write operations, the storage path 401 initially stores the data into cache 420 and NVS 422. The data is then destaged from NVS 422 to the DASD at a later time. In this fast write case, the data is transferred into the ADT buffer 414, 416 using the upper channel port 430. The data is then transferred from the ADT buffer 414, 416 to cache 420 using the upper cache port 424 and to NVS 422 using the lower cache port 426. As with caching operations, if the host processor requests to read the data before it is updated, the storage path 401 can direct the data to be read from the cache 420 thereby increasing the performance of the data processing system.

Figure 5:
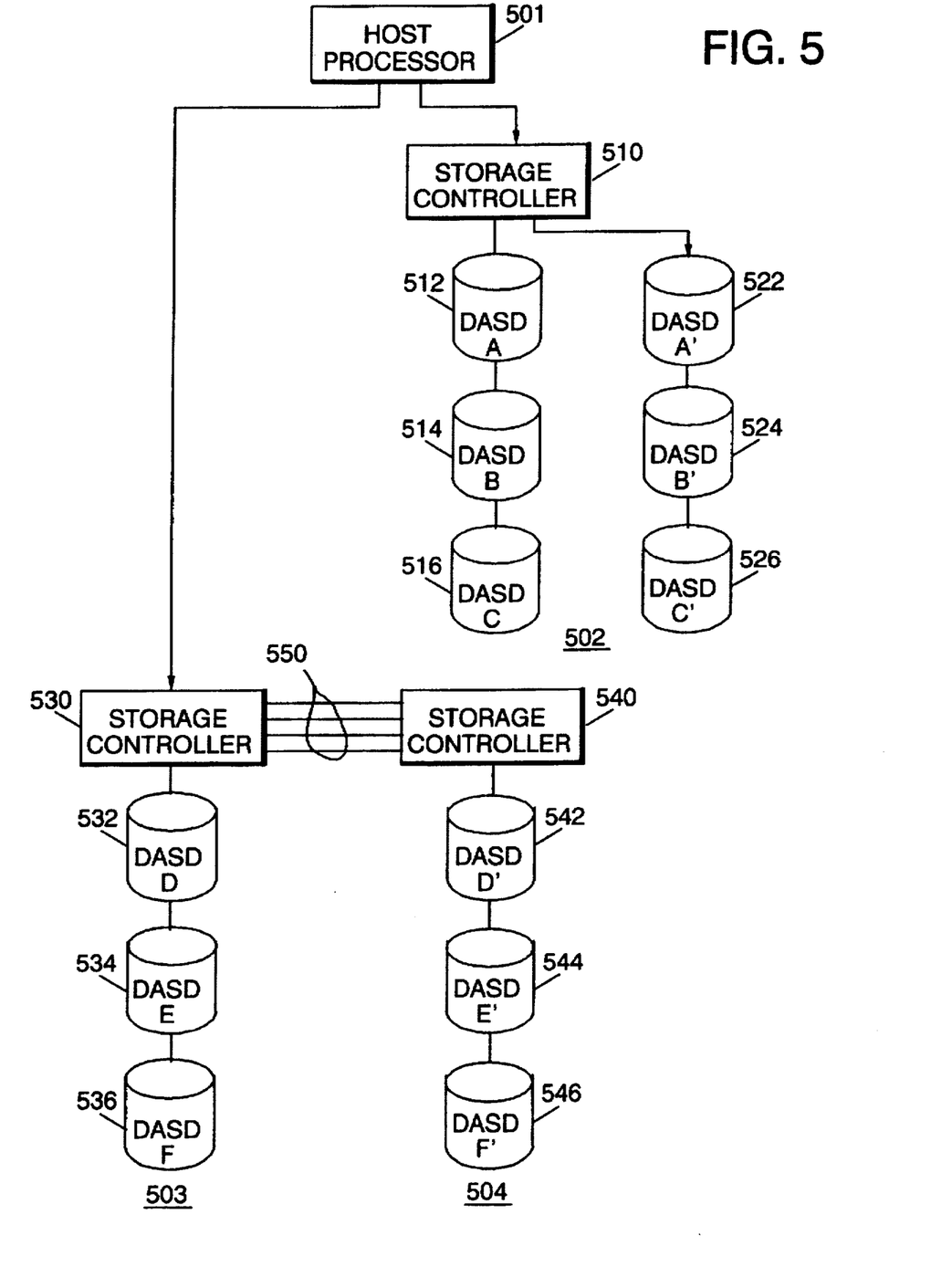
FIG. 5 is a block diagram showing multiple duplex pairs across multiple data storage device subsystems.

Referring to FIG. 5, a data processing system capable of both dual copy and remote dual copy disaster recovery functions is shown. A host processor 501, for example an IBM ES/9000, communicates to two storage subsystems 502, 503. A storage controller 510, for example an IBM 3990 Model 3, connected to DASDs 512, 514, 516, 522, 524, and 526, such as IBM 3390s, comprises one storage subsystem 502 located at the same primary site as the host processor 501.

This storage subsystem 502 performs dual copy operations backing up data written to primary DASDs 512, 514, and 516 onto secondary DASDs 522, 524, and 526 respectively. DASDs 512, 522 form one duplex pair. Similarly, two additional duplex pairs are formed DASDs 514, 524 and DASDs 516, 526.

When an application running in the host processor 501 generates a record to be written to the storage subsystem 502, the host processor 501 first transfers the record to the storage controller 510 of the storage subsystem 502. The storage controller 510 receives the record and issues channel end (CE) to the host processor signalling a successful transfer. The storage controller 510 then transfers the record to the primary DASD 512 and issues device end (DE) to the host processor 501 signalling a successful writing of the record to the primary DASD 512. The host processor 501 can now perform a subsequent operation to the storage subsystem 502 either writing a subsequent record to or reading a previously written record from one of the primary DASDs 512, 514, 516. The storage controller then transfers a copy of the record written to the primary DASD 512 to the secondary DASD 522 to provide a backup version of the record.

The host processor 501 is connected to another storage subsystem 503 comprised of a storage controller 530, for example an IBM 3990 Model 6, and several DASDs 532, 534, 536, such as IBM 3390s or IBM RAMACs. This storage subsystem 503 provides a primary site for a disaster recovery system. The DASDs 532, 534, 536 serve as primary DASDs of duplex pairs. The primary storage subsystem 503 is connected to a secondary storage subsystem 504 at a second remote site to complete the disaster recovery system. The connection 550 between the primary storage subsystem 503 and the secondary storage subsystem 504 is made through a direct communication link, for example an Enterprise Systems Connection (ESCON) link. The secondary storage subsystem consists of a storage controller 540, for example an IBM 3990 Model 6, connected to several DASDs 542, 544, 546, such as IBM 3390s or IBM RAMACs. The DASDs 542, 544, 546 in the secondary subsystem 504 serve as secondary DASDs for remote dual copy operations. Three duplex pairs are shown in the disaster recovery system in FIG. 5. DASDs 532, 542 form the first, DASDs 534, 544 form the second, and DASDs 536, 546 form the third duplex pair. Thus as an example, the host processor 501 writes a record to a primary DASD 532 through storage controller 530 of the primary storage subsystem 503. A copy of this record is then subsequently transferred by the primary storage controller 530 to the secondary storage controller 540 and stored on the secondary DASD 542 of the duplex pair.

An application running in the host processor issues I/O operations to the storage subsystem. Examples of I/O operations are reads from DASD, writes to DASD, and other commands to DASD not requiring the transfer of data. The application can issue I/O operations that are not conditioned upon another I/O operation, independent I/Os, or I/O operations that are condition upon another I/O operation, dependent I/Os. As an example of a dependent I/O, the application may issue a first I/O by writing a record to a primary DASD 532 and then issue a second I/O by writing an index pointing to the record to another primary DASD 534. The second I/O is a dependent I/O.

Dependent I/Os can create problems when a data processing system attempts to suspend multiple duplex pairs across multiple subsystems. The problem arises if the index pointing to the record is copied to the secondary DASD 544 before the duplex pair 534, 544 for the second I/O is suspended, but the duplex pair 532, 542 for the first I/O is suspended before the record is copied to the secondary DASD 542. In this example, the data on the secondary DASDs is not synchronized in a sequence consistent order. The index to the record has been copied to the secondary DASD 544, but the record has not been copied to the secondary DASD 542. Thus, suspending multiple duplex pairs across multiple storage subsystems requires that a second, dependent I/O cannot be copied to the secondary DASD of its duplex pair unless the first I/O is copied to the secondary DASD of its duplex pair.

Figure 6:
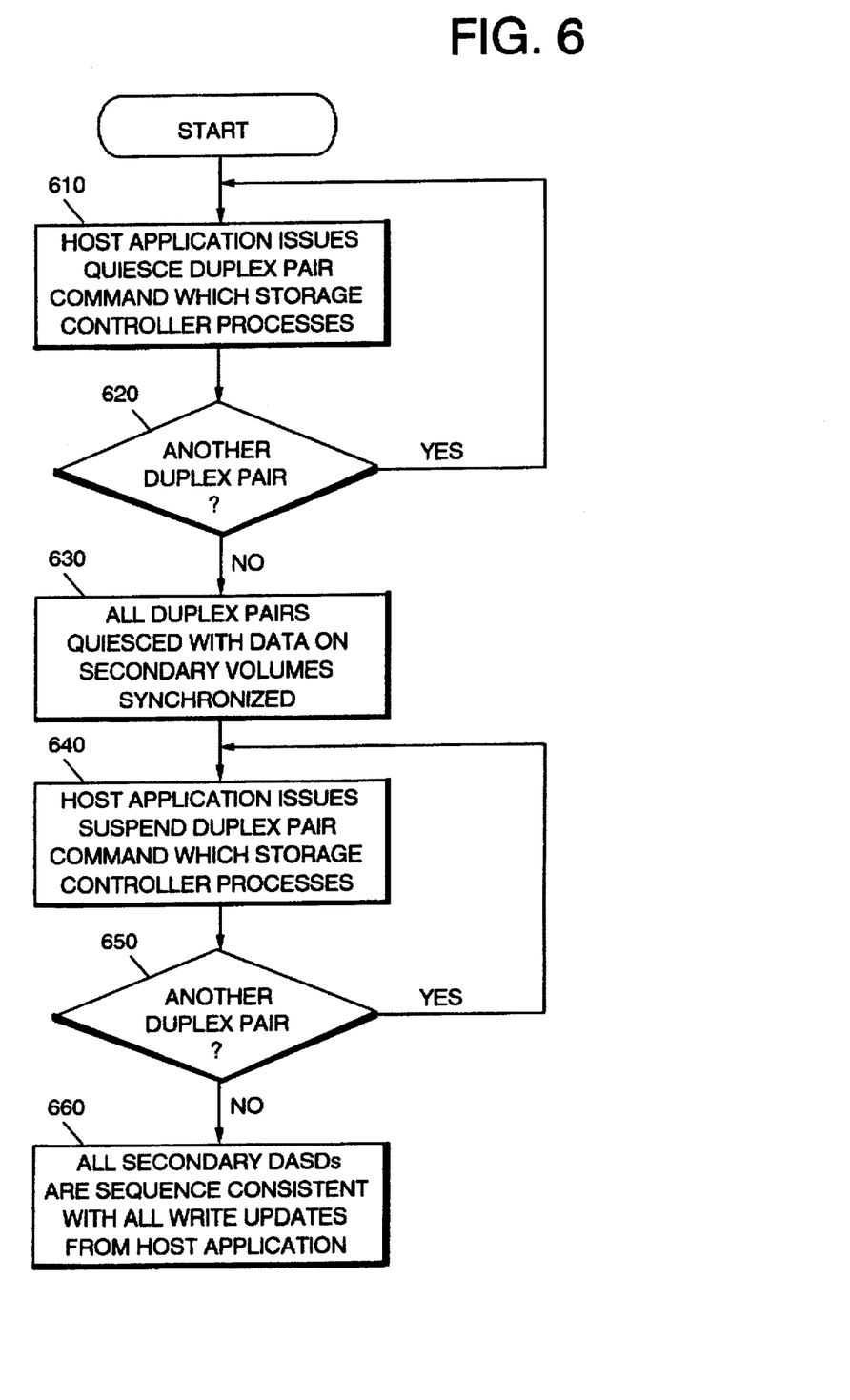
FIG. 6 is a flow diagram of a method for suspending multiple duplex pairs such that all data transmitted from the host application is synchronized on the secondary data storage devices.

Referring to FIG. 6, a flow diagram is shown describing a method for suspending multiple duplex pairs such that the data on the secondary devices remains synchronized in a sequence consistent order. At step 610, the host processor issues a quiesce duplex pair command to the storage controller for a specific duplex pair. The storage controller receives the command and quiesces the duplex pair. Quiescing the duplex pair allows any current I/O operation in progress to complete and causes any future I/O operation to the specified duplex pair to be queued in the storage controller or the host processor. A step 620 decides whether additional duplex pairs need to be quiesced. If so, step 610 is repeated for each additional duplex pair. Otherwise, step 630 indicates that all duplex pairs are quiesced and data on the secondary DASDs of the duplex pairs is synchronized in a sequence consistent order. The details of achieving sequence consistency on the secondary DASDs is described in FIG. 7.

At step 640, the host processor issues a suspend duplex pair to the storage controller for a designated duplex pair. The storage controller receives the command and suspends the duplex pair. Suspending the duplex pair releases the quiesce, allowing primary system application reads and writes to resume to the primary DASD of the duplex pair; while the suspended state prevents the copying of these changes to the secondary DASD of the duplex pair. Subsequent write operation from the host processor to the primary DASD are not copied by the storage controller to the secondary DASD. Instead, the storage controller can either terminate the duplex pair in response to a command from the host processor or record the physical DASD address, the physical location on the particular primary DASD, of the subsequent write operation. If the duplex pair is terminated, records written to the primary DASD after the duplex pair was suspended will not be copied to the secondary DASD when the duplex pair is subsequently reestablished. However, if the duplex pair is suspended with change recording, records written to the primary DASD after the duplex pair was suspended will be copied to the secondary DASD when the duplex pair is subsequently reestablished.

A step 650 decides whether additional duplex pairs need to be suspended. If so, step 640 is repeated for each additional duplex pair. Otherwise, step 660 indicates that all duplex pairs are suspended and data on the secondary DASDs of the duplex pairs is synchronized in a sequence consistent order and the application in the host processor is running using the primary DASDs.

Figure 7:
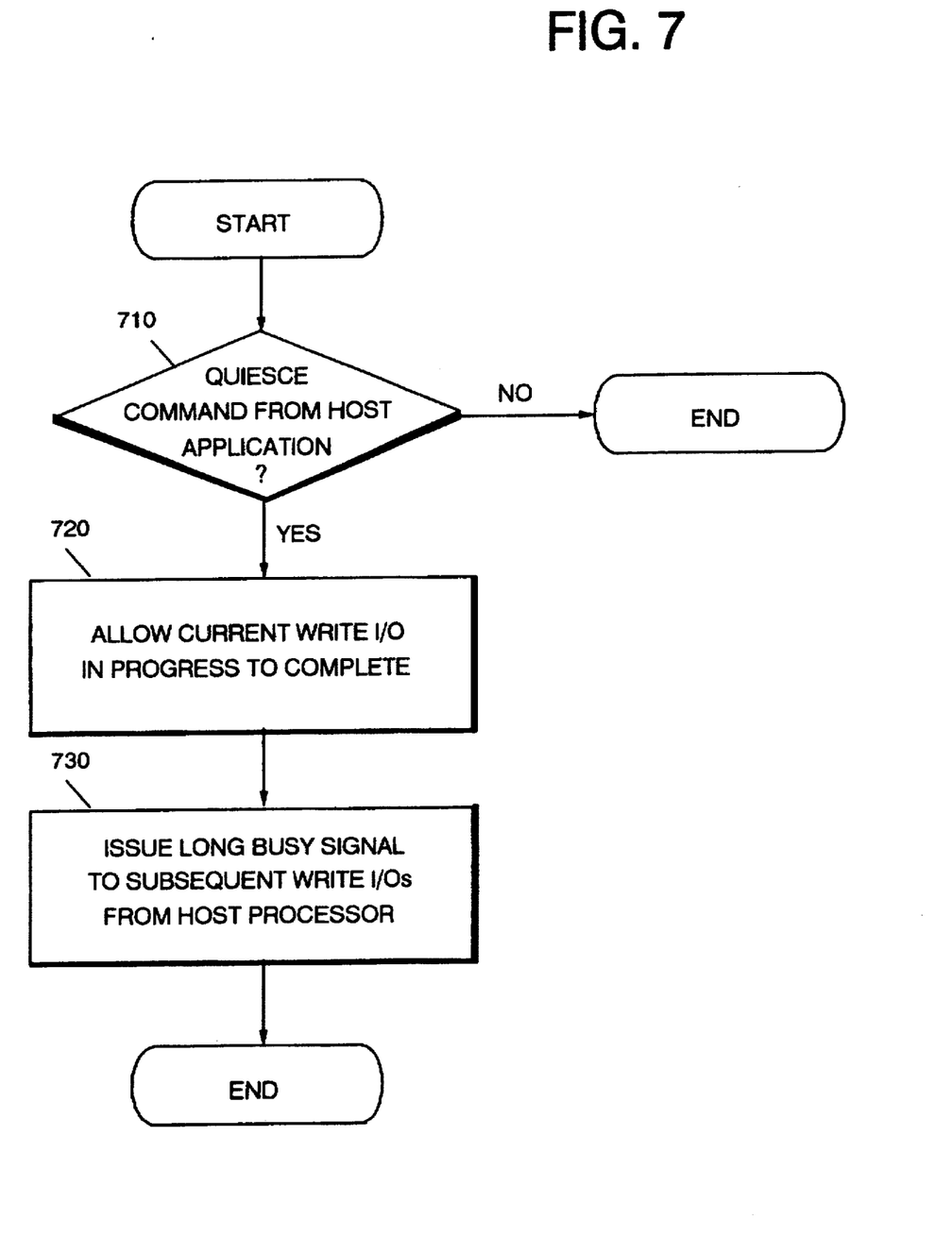
FIG. 7 is a flow diagram showing in greater detail the quiesce step of the method depicted in FIG. 6.

FIG. 7 shows a flow diagram describing the steps taken to quiesce a duplex pair. A step 710 decides whether a quiesce duplex pair command was received in the storage controller from the host processor. If no such command was received, the quiesce duplex pair process ends. Otherwise, the storage controller responds to the quiesce duplex pair command by setting a long busy flag specific to the primary DASD of the designated duplex pair. A step 720 indicates that the storage controller allows any write operation to the duplex pair started prior to the quiesce command and currently in progress to complete. At step 730, the long busy flag directs the storage controller to raise a long busy signal to the host processor in response to any subsequent I/O requests by the host processor to the duplex pair. Thus, the long busy signal causes subsequent I/O operations from the host processor to be queued in the host processor until the long busy operation is terminated. This queuing could also occur in the storage controller, but the host processor provides a better queuing platform.

The methods described in FIG. 6 and FIG. 7 can be illustrated by example using the configuration of FIG. 5. The host processor 501 writes a first I/O to primary DASD 534 of storage subsystem 503 and then a second, dependent I/O to primary DASD 532 of storage subsystem 503. The host processor 501 then issues consecutive quiesce duplex pair commands for all six duplex pairs in storage subsystems 502, 503, 504. The quiesce command for duplex pair 534, 544 need not be issued before that for duplex pair 532, 542.

At the time duplex pair 532, 542 is quiesced, the first I/O to duplex pair 534, 544 can be in any of three possible conditions: 1) the I/O can be completed to both the primary DASD 534 and the secondary DASD 544, 2) the I/O can be held long busy by storage controller 510 and consequently not yet transferred to either the primary DASD 534 or the secondary DASD 544, or 3) the I/O can be in progress to primary DASD 534 and eventually completed to secondary DASD 544 before storage controller 530 locks out subsequent I/Os with long busy.

If condition 2 occurred for the first I/O, the second I/O to duplex pair 532, 542 will not have been issued since it is a dependent I/O and is conditioned upon the completion of the first I/O. Thus, neither the first or second I/O will have been transferred prior to quiescing the duplex pairs and the secondary DASDs 534 and 542 will maintain sequence consistency.

If either condition 1 or 3 occurred for the first I/O, the second I/O can be in any of three possible conditions similar to the first I/O: A) the I/O can be completed to both the primary DASD 532 and the secondary DASD 542, B) the I/O can be held long busy by storage controller 530 and consequently not yet transferred to either the primary DASD 532 or the secondary DASD 542, or C) the I/O can be in progress to primary DASD 532 and eventually completed to secondary DASD 542 before storage controller 530 locks out subsequent I/Os with long busy. If condition B occurred for the dependent I/O, the dependent I/O is not transferred to duplex pair 532, 542 prior to its quiesce command, but the first I/O is completed to the duplex pair 534, 544 prior to its quiesce command. This, however, maintains sequence consistency on the secondary DASDs 544 and 542.

If either condition A or C occurred for the dependent I/O in conjunction with condition 1 or 3 for the first I/O, sequence consistency is maintained on the secondary DASDs 544 and 542. In any combination, the first I/O and the dependent I/O are completed to their respective secondary DASDs 544 and 542. The situation never arises where the dependent I/O is copied to its secondary DASD 542 and the first I/O is not copied to its secondary DASD 544. Thus, the secondary DASDs are synchronized and maintained in an order consistent with the sequence in which the primary DASDs were updated.

While this example dealt with duplex pairs in a synchronous remote copy configuration, the method also applies to duplex pairs in a dual copy configuration such as subsystem 501 and to duplex pairs across multiple storage controllers in either a remote copy or dual copy configuration.

While the invention has been particularly shown and described with reference to preferred embodiments thereof, it will be understood by those skilled in the art that various changes in form and details may be made therein without departing from the spirit and scope of the invention. For example, the formats of the record updates are not dispositive, such formats could be CKD, ECKD, fixed block architecture (FBA), etc. In addition, the storage devices are not meant to be limited to DASD devices.

What is claimed is:

1. In a data storage system capable of writing records and record updates and copying said records and record updates for backup purposes, said data storage system including a host processor running an application generating records and record updates, a first duplex pair having a primary data storage device and a secondary data storage device, a second duplex pair having a primary data storage device and a secondary data storage device, a storage controller coupled between said host processor and said first and said second duplex pairs, a method for suspending said first and said second duplex pairs while copying said records and record updates such that said secondary data storage devices of said first and said second duplex pairs remain synchronized in a sequence consistent order comprising steps of:

quiescing said first duplex pair by said storage controller in response to an initial quiesce command from said application to inhibit writing future records and record updates from said application to said primary data storage device of said first duplex pair, wherein said quiescing does not halt said application running in said host processor;

quiescing said second duplex pair by said storage controller in response to a subsequent quiesce command from said application to inhibit writing future records and record updates from said application to said primary data storage device of said second duplex pair and to synchronize records and record updates copied to said secondary data storage device of said first and second duplex pairs in a sequence consistent order, wherein said quiescing does not halt said application running in said host processor;

suspending said first and second duplex pairs by said storage controller receiving a suspend command from said application to inhibit copying, by said storage controller to said secondary data storage device of said first and second duplex pairs, of records and record updates transmitted from said application to said primary data storage device of said first and second duplex pairs; and signalling said application by said storage controller that said first and second duplex pairs are suspended and subsequent records and record updates can be written to said primary data storage device of said first and second duplex pairs without copying said record to said secondary data storage device of said first and second duplex pairs.

2. The method of claim 1 wherein said quiescing step further comprises issuing a Long Busy signal from said storage controller to said host processor for inhibiting subsequent writes of records and record updates from said application to said primary data storage device of said duplex pair.

3. The method of claim 1 further comprising said storage controller terminating said duplex pair such that subsequent records and record updates transferred from said host processor to said primary data storage device are not marked for later copying to said secondary device if said duplex pair is reestablished.

4. The method of claim 1 further comprising said storage controller marking records and record updates transferred from said host processor to said primary data storage device subsequent to suspending said duplex pair, such that said records and record updates are copied to said secondary data storage device if said duplex pair is reestablished.

5. In a data storage system providing data duplexing, said data storage system including a host processor running an application, a first duplex pair having a primary data storage device and a secondary data storage device, a second duplex pair having a primary data storage device and a secondary data storage device, a storage controller coupled between said host processor and said first and said second duplex pairs, said application generating records and record updates and issuing a quiesce duplex pair and a suspend duplex pair command, said primary data storage device for storing said records and record updates, said secondary data storage device for storing copies of said records and record updates, said storage controller for suspending said first and said second duplex pairs such that said secondary data storage devices remain synchronized in a sequence consistent order comprising:

a storage path for directing records and record updates between said host processor and said first and said second duplex pairs, said storage path quiescing said first and second duplex pairs in response to said quiesce duplex pair commands from said application, such that said application is not halted within said host processor, to inhibit writing future records and record updates from said application to said primary data storage devices of said first and said second duplex pairs, said storage path further suspending said first and second duplex pair in response to said suspend duplex pair commands from said application such that said records and record updates are copied to said secondary data storage devices of said first and said second duplex pairs and synchronized in a sequence consistent order; and a memory coupled to said storage path for storing said records and record updates to be copied to said secondary data storage device of said duplex pair.

6. The storage controller in claim 5 wherein said memory is a cache memory.

7. The storage controller in claim 5 further comprising a non-volatile storage (NVS) for storing records and record updates in sequence consistent order, said records and record updates to be subsequently copied to said secondary data storage device of said duplex pair.

8. The storage controller in claim 7 further comprising bit maps in said NVS for marking a physical address associated with said duplex pair receiving said record update while said duplex pair is suspended, said record update written to said primary data storage device while said duplex pair is suspended and said record update copied to said secondary data storage device once said duplex pair is reestablished.

9. The storage controller in claim 5 wherein said storage path further issues a Long Busy signal to said host processor in response to said quiesce duplex pair command to allow said record update currently being written from said host processor to said primary data storage device of said duplex pair to complete and to inhibit subsequent record updates to be written from said host processor to said primary data storage device of said duplex pair.

10. The storage controller in claim 5 wherein said secondary data storage devices are located at a remote site, said remote site including a secondary storage controller, said secondary storage controller coupled between said secondary data storage devices and a communication link, said communication link connecting said storage controller to said secondary storage controller.

11. The storage controller in claim 10 wherein said secondary storage controller further comprises:

a secondary memory for initially storing said plurality of record updates copied from said storage controller to said secondary storage controller; and a secondary storage path coupled between said communication link and said secondary data storage devices, said secondary memory further coupled to said secondary storage path, said storage path directing movement of said plurality of record updates between secondary memory and said secondary data storage devices such that said secondary data storage devices remain synchronized in a sequence consistent order.

12. A data storage system comprising:

a host processor running an application generating a plurality of record updates, said host processor issuing a quiesce duplex pair command and a suspend duplex pair command;

a channel coupled to said host processor;

a first and second duplex pair, each having a primary data storage device and a secondary data storage device, said primary data storage device for storing said plurality of record updates and said secondary data storage device for storing a copy of said plurality of record updates;

a storage controller coupled to said host processor by said channel and further coupled to said first and said second duplex pair, said storage controller comprising:

a memory for initially storing said plurality of record updates transferred from said host processor; and a storage path coupled between said channel and said first and said second duplex pairs, said memory further coupled to said storage path, said storage path directing movement of said plurality of record updates between said host processor and said primary data storage device through said memory, said storage path copying said plurality of record updates to said secondary data storage device, said storage path quiescing said first and second duplex pairs in response to said quiesce duplex pair commands from said application, such that said application is not halted within said host processor, to inhibit future writing of said plurality of record updates from said application to said primary data storage devices of said first and said second duplex pairs, said storage path further suspending said first and second duplex pair, in response to said suspend duplex pair commands from said application, such that said plurality of record updates copied to said secondary data storage devices remain synchronized in a sequence consistent order.

13. The data storage system in claim 12 wherein said memory in said storage controller is a cache memory.

14. The data storage system in claim 12 further comprising a non-volatile storage (NVS) in said storage controller coupled to said storage path, said NVS for storing records and record updates in sequence consistent order, said records and record updates to be subsequently copied to said secondary data storage device of said duplex pair.

15. The data storage system in claim 12 wherein said each secondary data storage device of said each duplex pair is located at a secondary site remote to said each primary data storage device, said secondary site further comprising a storage controller for receiving said records and record updates from said storage controller at said primary site and further coupled to said each secondary data storage device.

16. The data storage system in claim 13 wherein said secondary storage controller further comprises:

a secondary memory for initially storing said plurality of record updates copied from said storage controller to said secondary storage controller; and a secondary storage path coupled between said secondary memory and said secondary data storage devices, said secondary storage path directing movement of said plurality of record updates between said secondary memory and said secondary data storage devices such that said secondary data storage devices remain synchronized in a sequence consistent order.

17. The data processing system in claim 12 wherein said storage path in said storage controller further issues a Long Busy signal to said host processor in response to said quiesce duplex pair command to allow said record update currently being written from said host processor to said primary data storage device of said duplex pair to complete and to inhibit subsequent record updates to be written from said host processor to said primary data storage device of said duplex pair.

* * * * *